(12) United States Patent
Wan et al.

(10) Patent No.: US 11,945,966 B2
(45) Date of Patent: Apr. 2, 2024

(54) PHOTOCURABLE COMPOSITION WITH ENHANCED THERMAL STABILITY

(71) Applicant: CANON KABUSHIKI KAISHA, Tokyo (JP)

(72) Inventors: Fen Wan, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 17/643,534

(22) Filed: Dec. 9, 2021

(65) Prior Publication Data
US 2023/0183492 A1 Jun. 15, 2023

(51) Int. Cl.
| | | |
|---|---|---|
| C09D 4/00 | (2006.01) | |
| C08F 220/40 | (2006.01) | |
| C08F 222/26 | (2006.01) | |
| C09D 133/08 | (2006.01) | |
| C09D 135/02 | (2006.01) | |

(52) U.S. Cl.
CPC .............. *C09D 4/00* (2013.01); *C08F 220/40* (2013.01); *C08F 222/26* (2013.01); *C09D 133/08* (2013.01); *C09D 135/02* (2013.01)

(58) Field of Classification Search
USPC ........................................................ 522/121
See application file for complete search history.

(56) References Cited

U.S. PATENT DOCUMENTS

| | | | | |
|---|---|---|---|---|
| 5,041,511 | A | 8/1991 | Yanagawa | |
| 6,638,991 | B2 * | 10/2003 | Baba | ...................... C08F 230/08 |
| | | | | 522/90 |
| 7,037,954 | B2 * | 5/2006 | Baba | ...................... A61L 27/14 |
| | | | | 522/90 |
| 8,124,668 | B2 * | 2/2012 | Baba | ...................... G02B 1/043 |
| | | | | 528/499 |

(Continued)

FOREIGN PATENT DOCUMENTS

| | | | | |
|---|---|---|---|---|
| CA | 3037871 A1 | * | 4/2018 | ............ C08F 220/06 |
| CN | 101081941 A | * | 12/2007 | ............. B82Y 20/00 |

(Continued)

OTHER PUBLICATIONS

Rahmatpour et al. A novel route for synthesis of cross-linked polystyrene copolymer beads with tunable porosity using guar and xanthan gums from bioresources as alternative synthetic suspension stabilizers. Designed Monomers and Polymers vol. 21, 2018—Issue 1, pp. 116-129 (Year: 2018).*

(Continued)

*Primary Examiner* — Sanza L. McClendon
(74) *Attorney, Agent, or Firm* — Abel Schillinger, LLP

(57) ABSTRACT

A photocurable composition can comprise a polymerizable material and a photoinitiator, wherein the polymerizable material may comprise at least one first polymerizable monomer having a structure of Formula (1): $(R_1)_x$—Ar—$(R_2)_y$, (1), with Ar being one or more substituted or unsubstituted aromatic rings; $R_1$ being a structure covalently bonded to Ar including at least one acrylate group; x being 1-4; and $R_2$ being —CH=$CH_2$ or —$CCH_3$=$CH_2$ covalently bonded to Ar; y being 1-4.

19 Claims, 2 Drawing Sheets

(56) References Cited

U.S. PATENT DOCUMENTS

| | | |
|---|---|---|
| 8,703,892 B2 | 4/2014 | Kodama |
| 2013/0079482 A1 | 3/2013 | Gerlinger |
| 2015/0014894 A1 | 1/2015 | Kodama |
| 2017/0210837 A1 | 7/2017 | Ito |
| 2018/0321510 A1 | 11/2018 | Vetro |
| 2020/0339828 A1 | 10/2020 | Li |

FOREIGN PATENT DOCUMENTS

| | | | | |
|---|---|---|---|---|
| GH | 2010134402 A | * | 6/2010 | ............ G03H 1/02 |
| JP | 02138151 A | * | 5/1990 | |
| JP | 02196809 A | * | 8/1990 | ............ A61F 2/142 |
| JP | 06324494 A | * | 11/1994 | ............ G03F 7/039 |
| JP | 2007254495 A | * | 10/2007 | |
| JP | 2007528811 A | * | 12/2007 | |
| JP | 2007538381 | * | 12/2007 | |
| JP | 2008052254 A | * | 3/2008 | ........... G03F 7/0382 |
| JP | 5398966 B2 | * | 1/2014 | ............ C08F 12/24 |
| JP | 2014134709 A | * | 7/2014 | |
| JP | 2016015256 A | | 1/2016 | |
| KR | 20100016588 | * | 12/2010 | |
| KR | 20140043411 A | * | 4/2014 | |
| KR | 20160018785 A | * | 2/2016 | |
| KR | 20180014011 A | * | 7/2018 | |
| KR | 20170048502 A | * | 5/2019 | |
| TW | 201731920 A | * | 9/2017 | ............ C08G 73/10 |
| WO | 20170077359 A1 | | 5/2017 | |
| WO | 2020219162 A1 | | 10/2020 | |

OTHER PUBLICATIONS

Thermal stability and degradation of selected poly(alkyl methacrylates) used in the polymer industry:, J Therm Anal Calorim (2015) 119:1157-1161.

"Synthesis and characterization of new spirobisindane-based poly(imide)s: Structure effects on solubility, thermal behavior, and gas transport properties" J. Appl. Polym. Sci. 2020, DOI: 10.1002/APP.48944.

* cited by examiner

PHOTOCURABLE COMPOSITION WITH ENHANCED THERMAL STABILITY

FIELD OF THE DISCLOSURE

The present disclosure relates to a photocurable composition, particularly to a photocurable composition for inkjet adaptive planarization adapted for forming photo-cured layers.

BACKGROUND

Inkjet Adaptive Planarization (IAP) is a process which planarizes a surface of a substrate, e.g., a wafer containing an electric circuit, by jetting liquid drops of a photocurable composition on the surface of the substrate and bringing a flat superstrate in direct contact with the added liquid to form a flat liquid layer. The flat liquid layer is typically solidified under UV light exposure, and after removal of the superstrate a planar polymeric surface is obtained, which can be subjected to subsequent processing steps, for example, baking, etching, and/or further deposition steps.

Subsequent baking of the formed photo-cured layer is often conducted at temperatures above its glass transition temperature and close to its melting point, and requires a high thermal stability and low shrinkage.

There exists a need for improved IAP materials leading to planar photo-cured layers with high thermal stability during subsequent processing.

SUMMARY

In one embodiment, a photocurable composition can comprise a photoinitiator and a polymerizable material, wherein the polymerizable material may comprise at least one first polymerizable monomer having a structure of Formula (1): $(R_1)_x$—Ar—$(R_2)_y$, (1), with Ar being one or more substituted or unsubstituted aromatic rings; $R_1$ being a structure covalently bonded to Ar including at least one acrylate group; x being 1-4; and $R_2$ being —CH=$CH_2$ or —$CCH_3$=$CH_2$ covalently bonded to Ar; y being 1-4.

In one aspect of the photocurable composition, Ar of Formula (1) can be selected from benzene, phenylbenzene, or naphthalene.

In a particular aspect, the first polymerizable monomer of the photocurable composition can comprise a structure of Formula (2) or Formula (3):

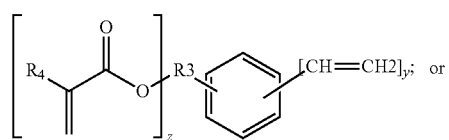

(2)

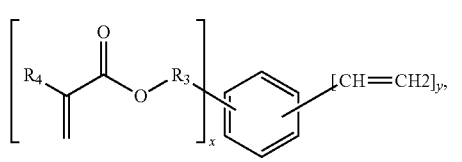

(3)

with $R_3$ being C1-C5 alkyl or oxyalkyl, x being 1-3; $R_4$ being hydrogen or C1-C4 alkyl; y being 1-4, and z being 1-3.

In another particular embodiment, the first polymerizable monomer of the photocurable composition can comprise at least one monomer of the following structures:

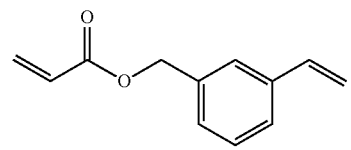

(4)

;

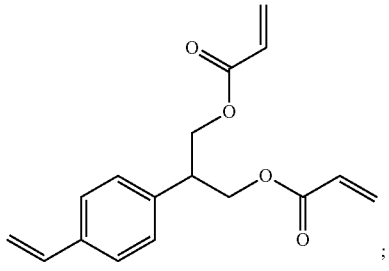

(5)

;

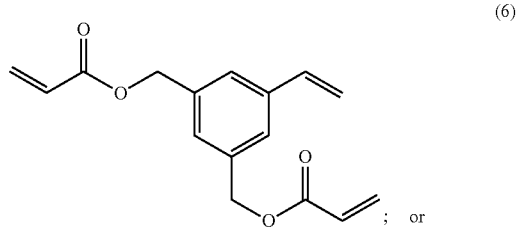

(6)

; or

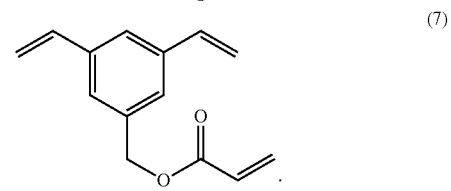

(7)

.

In one aspect, the first polymerizable monomer can have a vapor pressure not greater than 0.01 mmHg at 25° C. In a certain particular aspect, the cross-linking agent may have a vapor pressure not greater than 0.001 mmHg at 25° C.

In one embodiment, the at least one first polymerizable monomer can further comprise at least one second polymerizable monomer having a different structure than Formula I. In one aspect, the at least one second polymerizable monomer can include at least one mono-functional acrylate monomer. In another aspect, the second polymerizable monomer can comprise at least one mono-functional monomer and at least one multi-functional monomer.

In one embodiment, the amount of the polymerizable material can be at least 80 wt % based on the total weight of the photocurable composition.

In another embodiment, the viscosity of the photocurable composition at a temperature of 23° C. may be not greater than 50 mPa s.

In one aspect, the photocurable composition can be essentially free of a solvent.

In another aspect, the photocurable composition can comprise a solvent in an amount of at least 15 vol % based on the total volume of the photocurable composition.

In a certain aspect of the photocurable composition, the amount of the at least one first polymerizable monomer can be from 50 wt % to 100 wt % based on the total weight of the polymerizable material.

In another embodiment, a laminate can comprise a substrate and a photo-cured layer overlying the substrate, wherein the photo-cured layer can be formed from the above-described photocurable composition.

In one aspect of the laminate, the photo-cured layer can have an Ohnishi number of not greater than 3.2.

In a further aspect of the laminate, the photo-cured layer can have a degradation temperature greater than 300° C.

In one embodiment, a method of forming a photo-cured layer on a substrate can comprise: applying a layer of a photocurable composition on the substrate, wherein the photocurable composition may comprise a photoinitiator and a polymerizable material, the polymerizable material comprising at least one first polymerizable monomer having a structure of Formula (1): $(R_1)_x$—Ar—$(R_2)_y$, (1), with Ar being one or more substituted or unsubstituted aromatic rings; $R_1$ being a structure covalently bonded to Ar including at least one acrylate group; x being 1-4; $R_2$ being —CH=CH2 or —CCH$_3$=CH$_2$ covalently bonded to Ar; y being 1-3; bringing the photocurable composition into contact with a template or a superstrate; irradiating the photocurable composition with light to form a photo-cured layer; and removing the template or the superstrate from the photo-cured layer.

In one aspect of the method, the first polymerizable monomer can comprise a structure of formula (2) or formula (3):

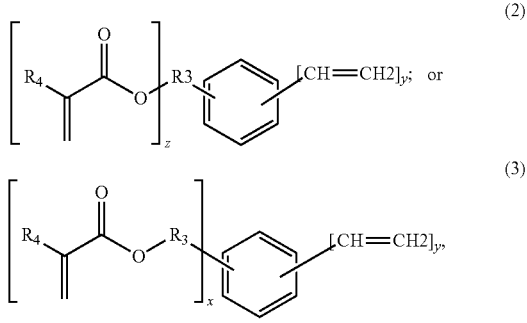

with $R_3$ being $C_1$-$C_5$ being alkyl or oxyalkyl, x being 1-4; $R_4$ being hydrogen or C1-C4 alkyl, y being 1-4, and z being 1-3.

In a further embodiment, a method of manufacturing an article can comprise: applying a layer of a photocurable composition on a substrate, wherein the photocurable composition comprises a polymerizable material and a photoinitiator, the polymerizable material comprising at least one first polymerizable monomer having a structure of Formula (1): $(R_1)_x$—Ar—$(R_2)_y$, (1), with Ar being one or more substituted or unsubstituted aromatic rings; $R_1$ being a structure covalently bonded to Ar including at least one acrylate group; x being 1-4; $R_2$ being —CH=CH2 or —CCH$_3$=CH$_2$ covalently bonded to Ar; y being 1-3; bringing the photocurable composition into contact with a template or a superstrate; irradiating the curable composition with light to form a cured layer; removing the template or the superstrate from the photo-cured layer; forming a pattern on the substrate; processing the substrate on which the pattern has been formed in the forming; and manufacturing an article from the substrate processed in the processing.

BRIEF DESCRIPTION OF THE DRAWINGS

Embodiments are illustrated by way of example and are not limited in the accompanying figures.

DETAILED DESCRIPTION

Figure 1:
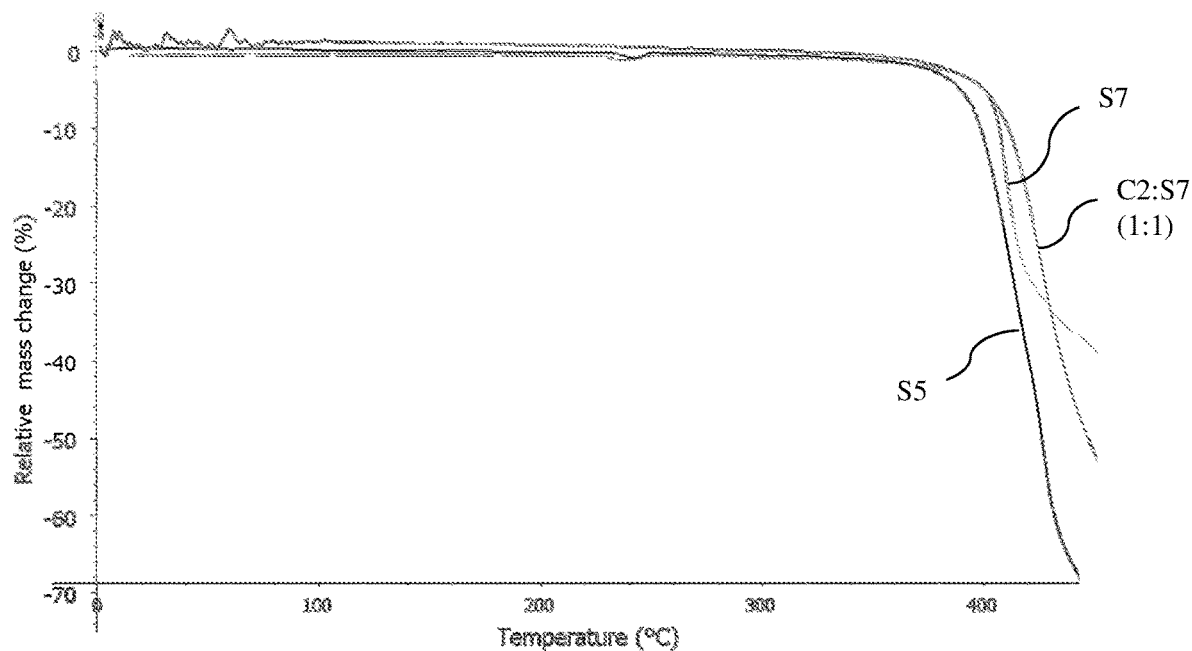
FIG. 1 includes a graph illustrating two TGA curves of photo-cured materials made from photocurable compositions according to embodiments.

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a photoinitiator and a polymerizable material, wherein the polymerizable material can comprise at least one first polymerizable monomer having a structure of Formula (1): $(R_1)_x$—Ar—$(R_2)_y$, (1), with Ar being one or more substituted or unsubstituted aromatic rings; $R_1$ being a structure covalently bonded to Ar including at least one acrylate group; x being 1-4; and $R_2$ being —CH=CH$_2$ or —CCH$_3$=CH$_2$ covalently bonded to Ar; y being 1-4. In certain aspects, Ar can be benzene, phenylbenzene, or naphthalene.

Not being bound to theory, a photocurable composition including a monomer with the structure of Formula (1), which contains at least one vinyl group and at least one acrylate group covalently bonded to an aromatic ring structure, may have advantages by combining the properties of aromatic vinyl monomers, such as a high carbon content, low viscosity, high etch resistance, with desired properties typical for acrylate monomers, for example, a high curing speed and a lower vapor pressure compared to vinyl monomers.

As used herein, if not indicated otherwise, the term first polymerizable monomer having a structure of Formula (1) is also called herein interchangeable "cross-linking agent", if not indicated otherwise. Not being bound to theory, it is assumed that the monomer can be self-crosslinking if used as the only monomer in the polymerizable material, but it can also assist in crosslinking other monomers contained in the composition, called herein at least one second polymerizable monomer.

In one aspect, the cross-linking agent of the present disclosure can have a vapor pressure of not greater than 0.01 mmHg at 25° C., or not greater than 0.05 mmHg, or not greater than 0.001 mmHg, or not greater than 0.0005 mmHg, or not greater than 0.0003 mmHg.

In a particular aspect, the cross-linking agent can have the structure shown in Formula (2) or Formula (3):

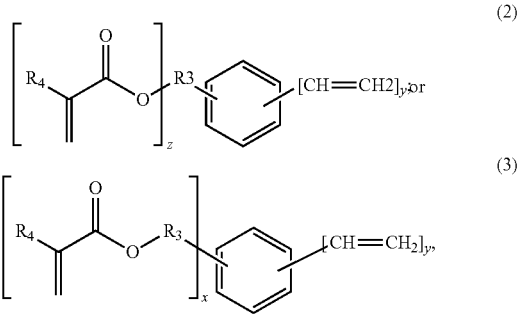

with $R_3$ being $C_1$-$C_5$ alkyl or oxyalkyl, x being 1-4; $R_4$ being hydrogen or $C_1$-$C_4$ alkyl; y being 1-4, and z being 1-3.

In certain particular aspects, the cross-linking agent may include 3-vinyl benzyl acrylate (structure 4), 2(4-vinyl)-phenyl; 1,3-propane diacrylate (structure 5); 3,5-bivinyl benzyl acrylate (structure 6); and 5-vinyl 1,3-xylene diacrylate (structure 7):

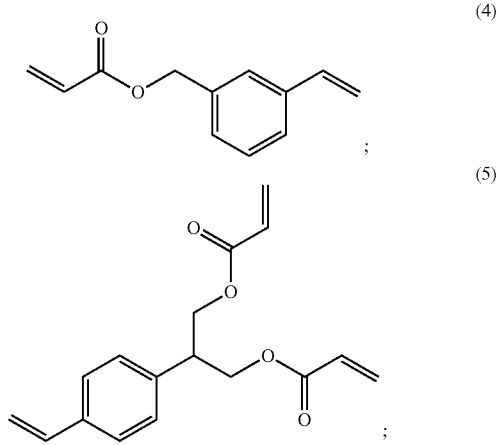

The photocurable composition of the present disclosure can be adapted for use in inkjet adaptive planarization (IAP) or in nanoimprint lithography (NIL).

The first polymerizable monomer of Formula 1 can have the advantage of a high carbon content, which may contribute to a high final carbon content in the formed photo-cured layer. In one aspect, the carbon content of the first polymerizable monomer can be at least 70 wt % based on the total molecular weight of the first monomer, or at least 72 wt %, or at least 76 wt %, or at least 78 wt %.

In one aspect, the viscosity of the photo-curable composition can be not greater than 50 mPa·s, such as not greater than 40 mPa·s, not greater than 30 mPa·s, not greater than 25 mPa·s, not greater than 20 mPa·s. In other certain embodiments, the viscosity may be at least 2 mPa·s. or at least 3 mPa·s, or at least 5 mPa·s. As used herein, all viscosity values relate to viscosities measured at a temperature of 23° C. with the Brookfield method using a Brookfield Viscometer.

The at least one second polymerizable monomer of the photocurable composition of the present disclosure can include at least one second polymerizable monomer having a different structure than the first polymerizable monomer. In one aspect, the at least one second polymerizable monomer can be at least one acrylate monomer. In a certain aspect, the at least one acrylate monomer can include two acrylate monomers, three acrylate monomers, four acrylate monomers, or five acrylate monomers. As used herein, the term "acrylate monomer" relates to an unsubstituted or an alkyl-substituted acrylate monomer, for example, a methacrylate monomer.

In another aspect, the at least one second polymerizable monomer can be a mono-functional monomer or a multi-functional monomer. In a certain aspect, the at least one first monomer of the polymerizable material can include at least one di-functional acrylate monomer or at least one tri-functional acrylate monomer. In a further aspect, the second polymerizable monomer may include a non-acrylic monomer, for example, a mono-functional or multi-functional vinylbenzene compound. In a certain particular aspect, the vinylbenzene compound can be divinylbenzene.

In one embodiment, the amount of the first polymerizable monomer of the polymerizable material can be at least 5 wt % based on the total weight of the polymerizable material, or at least 10 wt %, or at least 15 wt %, or at least 20 wt %, or at least 30 wt %, or at least 40 wt %, or at least 50 wt %, or at least 60 wt %. In another embodiment, the amount of the at least one first polymerizable monomer may be 100 wt % of the total weight of the polymerizable material, or not greater 95 wt %, or not greater than 90 wt %, or not greater than 80 wt %, or not greater than 70 wt %, or not greater than 60 wt % based on the total weight of the polymerizable material. In a certain aspect, the amount of the first polymerizable monomer can be in a range from 50 wt % to 100 wt % based on the total weight of the polymerizable material, or from 60 wt % to 97 wt %, or from 70 wt % to 95 wt %. In yet a further aspect, the amount of the first polymerizable monomer can range from 5 wt % to 40 wt %, of from 10 wt % to 30 wt % based on the total weight of the polymerizable material.

In another certain particular embodiment, the polymerizable material can consist essentially of the at least one first polymerizable monomer of Formula (1) and at least one further acrylate monomer, wherein the at least one further acrylate monomer relates to the at least one second polymerizable monomer, and consisting essentially means that not more than 1 wt % of the polymerizable material may be different polymerizable compounds.

The amount of polymerizable material in the photocurable composition can be at least 30 wt % based on the total weight of the photocurable composition, such as at least 50 wt %, at least 60 wt %, at least 70 wt %, at least 80 wt %, at least 85 wt %, at least 90 wt %, or at least 95 wt %. In another aspect, the amount of polymerizable material may be not greater than 99 wt %, such as not greater than 98 wt %, or not greater than 97 wt %, or not greater than 95 wt % based on the total weight of the photocurable composition. The amount of polymerizable material can be a value between any of the minimum and maximum values noted above. In a particular aspect, the amount of the polymerizable material can be at least 80 wt % and not greater than 98 wt %.

In another embodiment, the polymerizable material of the photocurable composition can include a certain amount of polymerizable monomers, oligomers, or polymers in addition to the cross-linking agent and the at least one first polymerizable monomer.

The photocurable composition can be adapted that a photo-cured layer formed from the photocurable composition may have a high thermal stability. In one aspect, an onset temperature for the thermal degradation of the of the photo-cured layer may be greater than 250° C., or greater than 300° C., or greater than 350° C., or greater than 375° C., or greater than 400° C. As used herein, the onset thermal degradation temperature is also called "thermal degradation temperature," and relates to the temperature in the TGA curve wherein a deflection of the curve from the almost linear plateau is first observed, shortly before the steep degradation decline of the sample.

In one embodiment, the first photocurable composition of the present disclosure can be essentially free of a solvent.

As used herein, if not indicated otherwise, the term solvent relates to a compound which can dissolve or disperse the polymerizable monomers and cross-linking agent but does not itself polymerize during the photo-curing of the photocurable composition. The term "essentially free of a solvent" means herein an amount of solvent being not greater than 5 wt % based on the total weight of the photocurable composition. In a certain particular aspect, the amount of the solvent can be not greater than 3 wt %, not greater than 2 wt %, not greater than 1 wt %, or the photocurable composition can be free of a solvent, except for unavoidable impurities.

In another particular aspect, the photocurable composition can include a solvent in an amount of at least 6 wt % based on the total weight of the photocurable composition, or at least 8 wt %, at least 10 wt %, at least 15 wt %, at least 20 wt %, at least 30 wt %, or at least 50 wt %. In another aspect, the amount of solvent may be not greater than 80 wt %, or not greater than 50 wt %, or not greater than 40 wt %, or not greater than 30 wt %, or not greater than 20 wt %, or not greater than 15 wt %.

In order to initiate the photo-curing of the composition if exposed to light, one or more photoinitiators can be included in the photocurable composition.

In a certain aspect, the curing can be also conducted by a combination of light and heat curing.

The photocurable composition can further contain one or more optional additives. Non-limiting examples of optional additives can be stabilizers, dispersants, solvents, surfactants, inhibitors, or any combination thereof.

In one embodiment, the photocurable composition can be applied on a substrate to form a photo-cured layer. As used herein, the combination of substrate and photo-cured layer overlying the substrate is called a laminate.

The combination of the at least one first polymerizable monomer and the at least one second polymerizable monomer of the polymerizable material, or using the at least one first polymerizable monomer as the only monomer of the polymerizable material can lead to a high carbon content in the formed photo-cured layer. In one embodiment, the carbon content of the photo-cured layer can be at least 70%, such as at least 72%, at least 73%, at least 74%, or at least 75%.

In another aspect, the photo-cured layer of the laminate can have an Ohnishi number of not greater than 3.2, or not greater than 3.0, or not greater than 2.9, or not greater than 2.8, or not greater than 2.7, or not greater than 2.6. In another aspect, the Ohnishi number may be at least 1.8, such as at least 1.9, at least 2.0, at least 2.1, at least 2.2, or at least 2.3.

In a particular embodiment, the photo-cured layer can have a carbon content of at least 70% and an Ohnishi number of not greater than 2.9.

The present disclosure is further directed to a method of forming a photo-cured layer. The method can comprise applying a layer of the photocurable composition described above over a substrate, bringing the photocurable composition into contact with a template or superstrate; irradiating the photocurable composition with light to form a photo-cured layer; and removing the template or the superstrate from the photo-cured layer.

The substrate and the solidified layer may be subjected to additional processing, for example, an etching process, to transfer an image into the substrate that corresponds to the pattern in one or both of the solidified layers and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like.

The photo-cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly discovered that a certain combinations of polymerizable monomers containing a cross-linking agent of formula (1) in a photocurable composition can have very suitable properties especially for IAP and NIL processing. The photocurable composition can form photo-cured layers having a high thermal stability. In one aspect, the polymerizable material of the photocurable composition of the present disclosure can consist essentially of the cross-linking agent and other acrylate monomers, and may have a thermal stability of greater than 300° C.

EXAMPLES

The following non-limiting examples illustrate the concepts as described herein.

Example 1

Preparing of the first polymerizable monomer (crosslinking agent).

A variety of crosslinking agents were prepared by acrylation of the OH-group of the corresponding starting compounds.

3-vinyl benzyl acrylate (VBA) (S4)

40 g 3-vinyl benzene methanol (0.3 mol) and 45.9 g triethyl amine $(Et)_3N$ (0.45 mol) were dissolved in 900 ml dry dichloromethane $(CH_2Cl_2)$ and cooled down to 0° C. with an ice-water bath. To this solution was dropped under stirring a solution of 32.6 g acryloyl chloride dissolved in 100 ml $CH_2Cl_2$. The resultant mixture was allowed to warm to room temperature and stirred for 12 hours. From the reaction mixture, the organic phase was washed with saturated NaCl solution and then dried over $Na_2SO_4$. After the drying, the solvent was removed by distillation under vacuum.

A summary of the chemical reaction scheme is shown below:

In a similar manner as described above for synthesizing 3-vinyl benzyl acrylate, the compounds 2-(4-vinyl)-phenyl-1,3-dipropane diacrylate (5); 3,5-bivinyl benzyl acrylate (6); and 5-vinyl 1,3-xylylene diacrylate (7) were synthesized. The reaction schemes for these reactions are summarized below:

2-(4-vinyl)-phenyl, 1,3-dipropane diacrylate (VPDD) (S5)

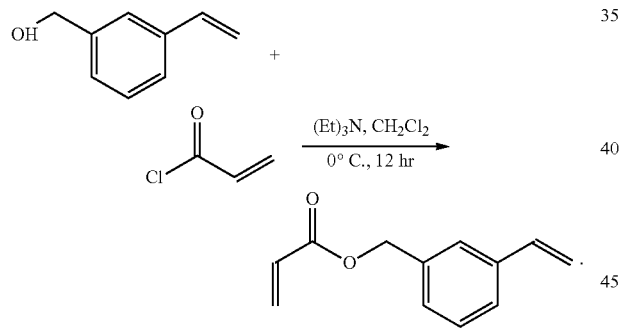

3,5-divinyl benzyl acrylate (DVBA) (S6)

5-vinyl 1,3-xylylene diacrylate (VXDA) (S7)

Example 2

Comparison of properties of cross-linking agents

The cross-linking agents made in Example 1, such as samples S4, S5, S6, and S7 were analyzed by their viscosity, vapor pressure and thermal stability.

As comparative samples, only acrylate group containing monomers and only vinyl group containing monomers were selected, and analyzed the same way as the cross-linking agents representative for the present disclosure, which contained both acrylate groups and vinyl groups. The following comparative monomers were tested: C1: benzyl acrylate (BZA), C2: m-xylylene diacrylate (MXDA); C3: styrene monomer (SM); and C4: divinyl benzene (DVB).

Viscosities

The viscosities were measured with a Brookfield DV-11+ Pro viscometer using spindle #18. For each viscosity measurement, a sample of 6-7 ml was taken, added to the sample chamber and allowed to equilibrate for 15-20 minutes to reach the target temperature of 23° C. The viscosities were measured with spindle #18 at a speed of 135 rpm. For each sample, the measurement was three times repeated and an average value calculated.

A summary of the measured viscosities (each related to 100% monomer, except unavoidable impurities) is shown in Table 1.

TABLE 1

|   | Name | Viscosity [mPa s] | Calculated vapor pressure [mmHg] |
|---|------|-------------------|----------------------------------|
| S4 | VBA | 4.02 | 0.00902 |
| S5 | VPDD | 78.55 | 0.000143 |
| S6 | DVBA | 7.7 | 0.00106 |
| S7 | VXDA | 17.55 | 0.000296 |
| C1 | BZA | 2.4 | 0.067 |
| C2 | MXDA | 11.08 | 0.00116 |
| C3 | SM | 0.76 | 5.1 |
| C4 | DVB | 1.1 | 0.663 |

It can be seen from the data in Table 1 that comparative monomer C2, which contained two acrylate groups (MXDA), had a 4 times higher viscosity than the acrylate monomer C1 having only one acrylate group (BZA). The lowest viscosities were measured for comparative samples C3 (styrene monomer) and C4 (divinyl benzene), which only contain vinyl groups and no acrylate groups.

The cross-linking agents S4, S5, S6 and S7, of which each contained combinations of vinyl group(s) and acrylate group(s) covalently bonded to the benzene ring had viscosities that were higher than the viscosities of the comparative monomers, but still in a range suitable for use in IAP or NIL processing.

Vapor Pressure

Also summarized in Table 1 are the calculated vapor pressures of all the listed monomers. Monomers S4, S5, S6, and S7 all have an at least 10 times lower vapor pressure than the comparable monomers C1-C4. Monomers with a low vapor pressure are desirable in IAP and NIL processing to avoid loss of the resist composition after applying the resist on the substrate and before photo-curing.

The vapor pressure was calculated by using the software program of the US Environmental Protection Agency, called EPISuite™, version 4.1. It was proven with the comparative examples of the styrene monomer (SM) and DVB that the calculations are correct. The differences between calculated and actually tested vapor pressure was not greater than 6 percent of the total vapor pressure values.

Photo-Curing and Thermal Stability

Cross-linking agents S5 (VPDD) and S7 (VXDA) were photo-cured with a radiation energy of 2.4 J, and the cured materials were analyzed via thermographical analysis (TGA). The TGA was conducted using a LINSEIS STA PT1000 instrument (Linseis Messgeraete GmbH, Germany). All measurements were conducted under nitrogen at a rate of 5 liter per hour. The samples (about 25 mg per test) were heated at a rate of 20° C./minute and the loss of weight was continually recorded. The TGA curves are shown in FIG. 1. It can be seen that the degradation of the materials started at temperatures greater than 380° C. The exact degradation temperature was 388.6° C. for Monomer S5, and 399.5° C. for Monomer S7. As used herein, the degradation temperature relates to the initial degradation temperature T(X), which is the temperature of the TGA curve wherein a deflection of the curve from the almost linear plateau shape is first observed, shortly before the steep decline of the mass of the sample, i.e., degradation.

FIG. 1 further includes a TGA curve of a photo-cured layer formed by photo-curing a photocurable composition which contained monomer S7 and monomer C2 at an even weight percent ratio of 1:1. The initial degradation temperature T(X) for this material was 398° C.

The curing of the functional groups (acrylate and vinyl groups) was evaluated by observing the change of the absorption peak of the photo-cured samples of the cross-linking agents at 809 cm$^{-1}$ in the FTIR spectra. The absorption peak relates to C=C double bond of the vinyl groups and the acrylate groups.

For these experiments, photo-cured layers were prepared by applying about 10 m thick layer of the monomer on a NaCl window and photo-curing the layer with light radiation having a radiation wavelength of 365 nm and an intensity of 38 mW/cm$^2$ for 263 seconds for a dosage of 10 J. The photo-cured layers were subjected to a baking treatment by placing them on a hot plate having a temperature of 250° C. for 2 minutes. Thereafter, after allowing the layers to cool to room temperature and measuring the FTIR spectrum, the same test was repeated by placing the photo-cured layers on a hot plate having a temperature of 350° C. for 2 minutes. A summary of the test results is shown in Table 2.

The same test was conducted with comparative sample C2, a di-functional acrylate monomer. Sample C2 was cured with a curing energy of 1.2 J.

Furthermore, compositions were prepared by mixing sample C2 with sample S5 at a weight % ratio of 1:4, similarly, sample C2 was combined with sample S7 at a 1:4 weight % ratio.

For each photocurable composition, as photoinitiator was used Irgacure 907 in an amount of 2 wt % based on the total weight of the photocurable composition.

The results summarized in Table 2 demonstrate that photo-cured layers made from the cross-linking agents of the present disclosure are stable at temperatures of 250° C. and 350° C., and that a further curing (reaction) of the functional groups occurred at the higher temperatures. In contrast, the di-functional acrylate sample C2 was cured already to a high percentage at room temperature (23° C.). Sample C2 did not survive the baking treatments at 350° C., but the combination of C2 with S5 or S7 at a weight percent ratio of 1:4 could improve the thermal stability of C2, and it was possible to conduct the baking treatments at 250° C. and 350° C.

Furthermore, by combining monomer C2 with the monomers S5 or S7 at a weight percent ratio of 1:4, the percentage of curing (C=C conversion) at room temperature could be enhanced. The combination of monomers C2 and S7 at a weight percent ratio of 1:1 further increased the conversion percentage at room temperature to a conversion rate of 78.14%.

Figure 2A:
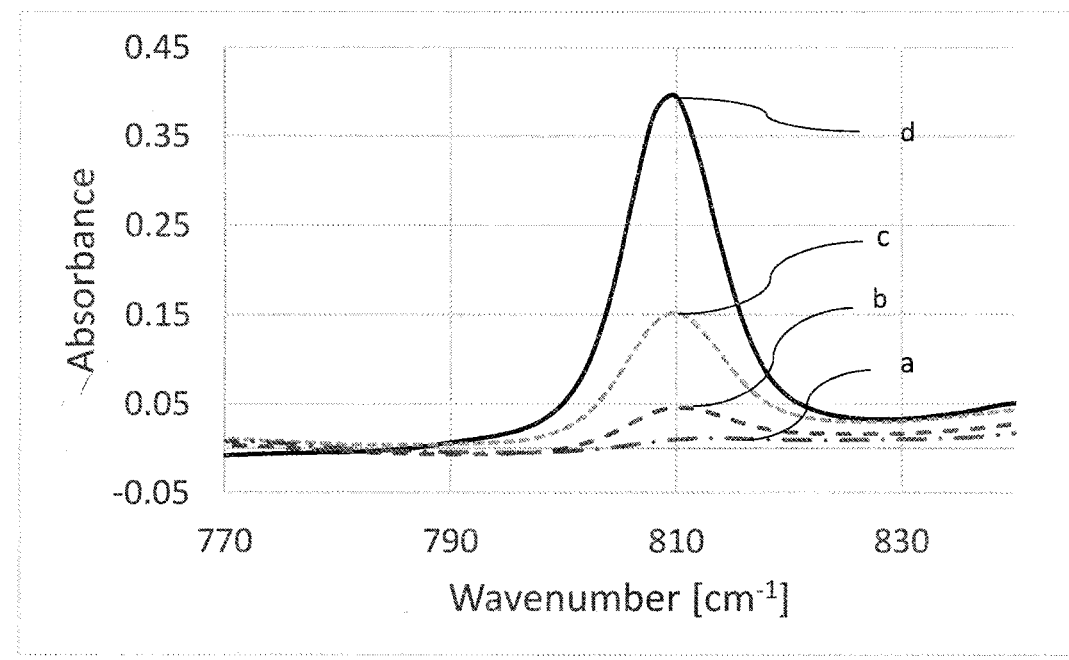
FIG. 2A includes a graph illustrating the decrease of the peak at 809 cm$^{-1}$ of photo-cured layers at different stages of curing made from photocurable compositions according to one embodiment.
Figure 2B:
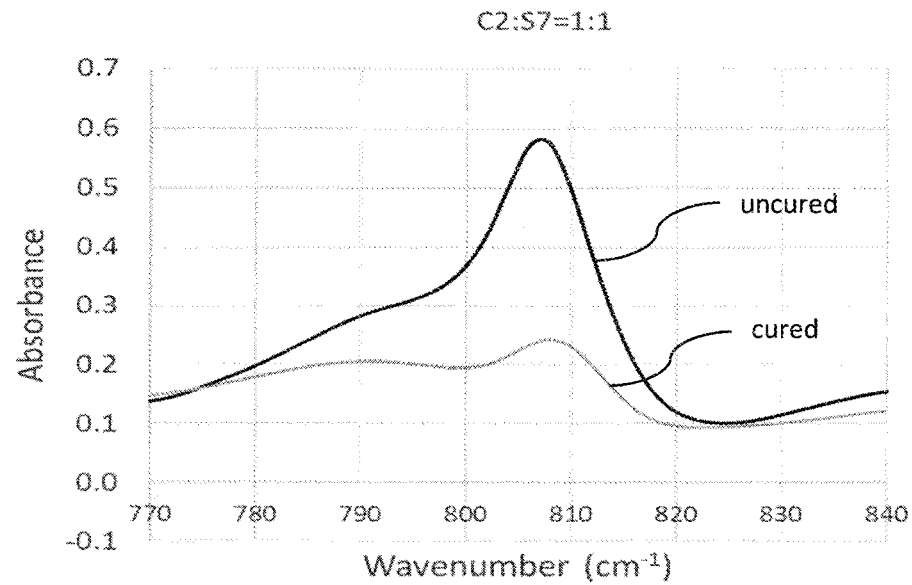
FIG. 2B includes a graph comparing the absorption peak maximum at 809 cm$^{-1}$ for the photocurable composition containing C2 and S7 in even weight percent amounts before and after curing according to one embodiment.

An example of measuring the percentage of the curing of sample S7 is shown in FIG. 2A, by following the decrease of the peak maximum at 809 cm$^{-1}$ at different stages of the curing, such as uncured (d), curing at room temperature (c), baking at 250° C. (b), and baking at 350° C. (a). The observed peak at 809 cm$^{-1}$ is a characteristic peak for —C=C— double bonds. FIG. 2B illustrates the decrease of the absorption peak maximum at 809 cm$^{-1}$ for the composition containing C2 and S7 in even weight percent amounts, comparing the uncured composition and the formed layer after curing at room temperature (23° C.).

TABLE 2

|  | C=C conversion [%] | | | | |
| --- | --- | --- | --- | --- | --- |
|  | S5 | S7 | C2 | C2:S5 (1:4) | C2:S7 (1:4) |
| Room temperature | 64.60 | 61.20 | 89.00 | 64.40 | 70.70 |
| 250° C. baking | 86.50 | 88.00 | N/A | 83.50 | 79.20 |
| 350° C. baking |  | 97.80 | N/A | 94.90 | 84.00 |

Carbon Content and Ohnishi Number

Further important properties for developing a suitable photocurable composition for IAP and NIL processing are the carbon content and Ohnishi number.

Table 3 shows a summary of the calculated percent carbon content and the Ohnishi number for the representative cross-linking agents made in Example 1.

The Ohnishi number (ON) is known to be an empirical parameter and was calculated as the ratio of total number of atoms (N$_t$) in the polymer repeat unit divided by the difference between the number of carbon atoms (Nc) and oxygen atoms (N$_O$) in the unit, ON=N$_t$/(N$_C$–N$_O$). For the calculation of the Ohnishi number, it was assumed that the cured materials contained 100 wt % of the polymerized monomer units formed by addition polymerization (no loss of atoms during polymerizations).

The carbon content was calculated as the percent of carbon atoms based on the total molecular weight of the compound.

It can be seen from Table 3, that all cross-linking agents had a carbon content greater than 70 percent and Ohnishi numbers lower than 3.2.

TABLE 3

| Sample | Name | Carbon Content [%] | Ohnishi Number |
| --- | --- | --- | --- |
| S4 | VBA | 76.60 | 2.2 |
| S5 | VPDD | 71.30 | 3.0 |
| S6 | DVBA | 78.50 | 2.5 |
| S7 | VXDA | 70.51 | 3.0 |

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material and a photoinitiator, wherein the polymerizable material comprises at least one first polymerizable monomer having a structure of formula (1): (R$_1$)$_x$—Ar—(R$_2$)$_y$, (1), with Ar being one or more substituted or unsubstituted aromatic rings;

R$_1$ being a structure covalently bonded to Ar including at least one acrylate group; x being 1-4;

R$_2$ being —CH=CH$_2$ or —CCH$_3$=CH$_2$ covalently bonded to Ar; y being 1-4, and wherein an amount of the at least one first polymerizable monomer is in a range from 50 wt % to 100 wt % based on the total weight of the polymerizable material.

2. The photocurable composition of claim 1, wherein Ar is selected from benzene, phenylbenzene, or naphthalene.

3. The photocurable composition of claim 2, wherein the at least one first polymerizable monomer comprises a structure of formula (2) or formula (3):

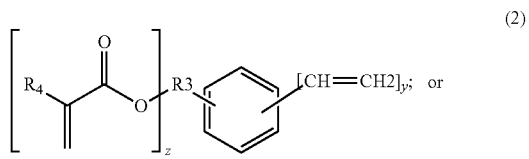

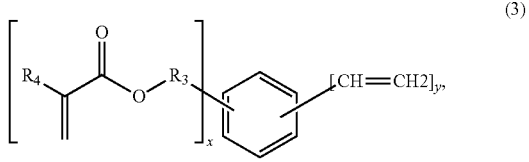

with R$_3$ being C1-C5 alkyl or oxyalkyl, x being 1-4; R$_4$ being hydrogen or C1-C4 alkyl;

y being 1-4, and z being 1-3.

4. The photocurable composition of claim 3, wherein the at least one first polymerizable monomer comprises at least one of the following structures:

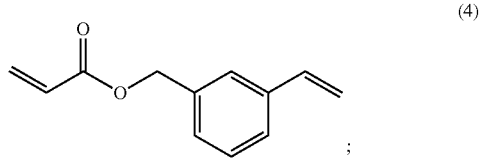

-continued

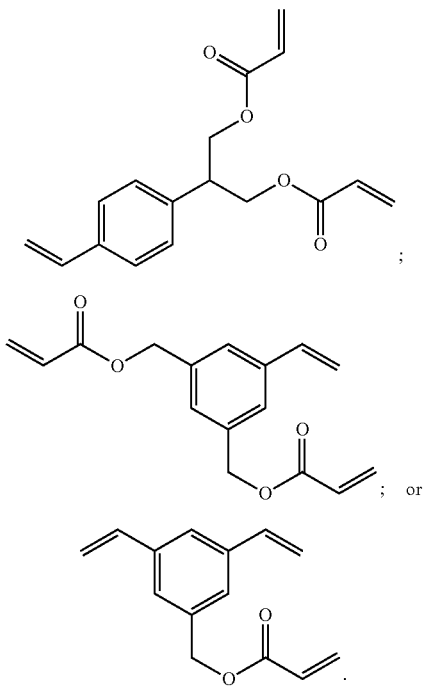

5. The photocurable composition of claim 1, wherein the at least one first polymerizable monomer has a vapor pressure not greater than 0.01 mmHg at 25° C.

6. The photocurable composition of claim 5 A photocurable composition comprising a polymerizable material and a photoinitiator, wherein the polymerizable material comprises at least one first polymerizable monomer having a structure of formula (1): $(R_1)_x$—Ar—$(R_2)_y$ (1), with
Ar being one or more substituted or unsubstituted aromatic rings;
$R_1$ being a structure covalently bonded to Ar including at least one acrylate group; x being 1-4;
$R_2$ being —CH=$CH_2$ or —$CCH_3$=$CH_2$ covalently bonded to Ar;
y being 1-4,
wherein the at least one first polymerizable monomer has a vapor pressure not greater than 0.001 mmHg at 25° C.

7. The photocurable composition of claim 1, wherein the polymerizable material further comprises at least one second polymerizable monomer having a different structure than Formula I.

8. The photocurable composition of claim 7, wherein the at least one second polymerizable monomer includes at least one mono-functional acrylate monomer.

9. The photocurable composition of claim 7, wherein the at least one second polymerizable monomer comprises at least one mono-functional monomer and at least one multi-functional monomer.

10. The photocurable composition of claim 1, wherein an amount of the polymerizable material is at least 80 wt % based on the total weight of the photocurable composition.

11. The photocurable composition of claim 1, wherein a viscosity at 23° C. of the photocurable composition is not greater than 50 mPa s.

12. The photocurable composition of claim 1, wherein the photocurable composition comprises a solvent in an amount of at least 15 vol % based on the total volume of the photocurable composition.

13. The photocurable composition of claim 1, wherein the photocurable composition is essentially free of a solvent.

14. A laminate comprising a substrate and a photo-cured layer overlying the substrate, wherein the photo-cured layer is formed from the photocurable composition of claim 1.

15. The laminate of claim 14, wherein the photo-cured layer has an Ohnishi number of not greater than 3.2.

16. The laminate of claim 14, wherein the photo-cured layer has degradation temperature of at least 300° C.

17. A method of forming a photo-cured layer on a substrate, comprising:
applying a layer of a photocurable composition on the substrate, wherein the photocurable composition comprises a photoinitiator and a polymerizable material, the polymerizable material comprising at least one first polymerizable monomer having a structure of formula (1): $(R_1)_x$—Ar—$(R_2)_y$ (1), with Ar being one or more substituted or unsubstituted aromatic rings; $R_1$ being a structure covalently bonded to Ar including at least one acrylate group; x being 1-4; $R_2$ being —CH=CH2 or —$CCH_3$=$CH_2$ covalently bonded to Ar; y being 1-4, and wherein an amount of the at least one first polymerizable monomer is in a range from 50 wt % to 100 wt % based on the total weight of the polymerizable material;
bringing the photocurable composition into contact with a template or a superstrate;
irradiating the photocurable composition with light to form a photo-cured layer; and
removing the template or the superstrate from the photo-cured layer.

18. The method of claim 17, wherein the cross-linking agent comprises a structure of formula (2) or formula (3):

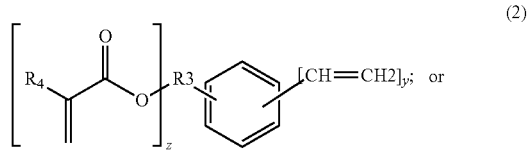

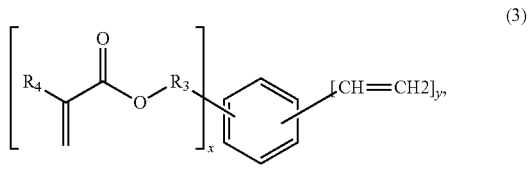

with $R_3$ being $C_1$-$C_5$ being alkyl or oxyalkyl, x being 1-4; $R_4$ being hydrogen or C1-C4 alkyl, y being 1-4, and z being 1-3.

19. A method of manufacturing an article, comprising forming a photo-cured layer on a substrate according to claim 17, and further comprising:
forming a pattern on the substrate;
processing the substrate on which the pattern has been formed in the forming; and
manufacturing an article from the substrate processed in the processing.

* * * * *

UNITED STATES PATENT AND TRADEMARK OFFICE
CERTIFICATE OF CORRECTION

| | |
|---|---|
| PATENT NO. | : 11,945,966 B2 |
| APPLICATION NO. | : 17/643534 |
| DATED | : April 2, 2024 |
| INVENTOR(S) | : Fen Wan et al. |

It is certified that error appears in the above-identified patent and that said Letters Patent is hereby corrected as shown below:

In the Claims

- In Column 15, Line 33, Claim 6, please delete "The photocurable composition of claim 5".

- In Column 16, Line 57, Claim 19, please delete "according to claim 17," and insert --according to claim 18,--.

Signed and Sealed this
Sixth Day of May, 2025

Coke Morgan Stewart
*Acting Director of the United States Patent and Trademark Office*